United States Patent
Cheong et al.

(10) Patent No.: US 8,243,248 B2
(45) Date of Patent: Aug. 14, 2012

(54) POLYMERIZABLE LIQUID CRYSTAL COMPOSITION AND OPTICAL FILM AND DEVICE USING THE SAME

(75) Inventors: Jaeho Cheong, Daejeon (KR); Minjin Ko, Daejeon (KR); Myungsun Moon, Daejeon (KR); Daeho Kang, Daejeon (KR); Bumgyu Choi, Seo-gu (KR); Kiyoul Lee, Daejeon (KR); YunBong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 486 days.

(21) Appl. No.: 12/451,500

(22) PCT Filed: May 22, 2008

(86) PCT No.: PCT/KR2008/002865
§ 371 (c)(1),
(2), (4) Date: Nov. 16, 2009

(87) PCT Pub. No.: WO2008/143470
PCT Pub. Date: Nov. 27, 2008

(65) Prior Publication Data
US 2010/0118232 A1    May 13, 2010

(30) Foreign Application Priority Data
May 22, 2007  (KR) .................. 10-2007-0049738

(51) Int. Cl.
*C09K 19/02* (2006.01)
*G02F 1/1337* (2006.01)

(52) U.S. Cl. ..... 349/183; 349/130; 428/1.1; 252/299.01

(58) Field of Classification Search .................. 349/86, 349/183, 182, 127, 130, 135, 117, 141; 428/1.1, 428/1.2; 252/299.01
See application file for complete search history.

(56) References Cited

U.S. PATENT DOCUMENTS

| | | | |
|---|---|---|---|
| 6,115,095 A | 9/2000 | Suzuki et al. | |
| 7,407,691 B2 * | 8/2008 | Shundo et al. | 428/1.1 |

FOREIGN PATENT DOCUMENTS

| | | |
|---|---|---|
| JP | 2000-098134 | 4/2000 |
| JP | 2001-055573 | 2/2001 |
| JP | 2001-166133 | 6/2001 |
| JP | 2003-149441 | 5/2003 |
| JP | 2003-251643 | 9/2003 |
| KR | 10-2005-0048502 | 5/2005 |
| KR | 10-2006-0097561 | 9/2006 |
| WO | WO 93/22397 | 11/1993 |

* cited by examiner

*Primary Examiner* — Thoi Duong
(74) *Attorney, Agent, or Firm* — McKenna Long & Aldridge LLP (57) ABSTRACT

Disclosed is a polymerizable liquid crystal composition which is applicable on a supporting substrate, such as a transparent plastic film for optical use, or glass, etc., and has a homeotropic alignment. Also, disclosed is an optical film obtained by aligning and fixing the polymerizable composition on a substrate.

10 Claims, 1 Drawing Sheet

POLYMERIZABLE LIQUID CRYSTAL COMPOSITION AND OPTICAL FILM AND DEVICE USING THE SAME

This application claims the benefit of PCT/KR2008/002865 filed on May 22, 2008 and Korean Patent Application No. 10-2007-0049738 filed on May 22, 2007, both of which are hereby incorporated herein by reference for all purposes in their entirety.

TECHNICAL FIELD

The present invention relates to a polymerizable liquid crystal composition applicable to a supporting substrate, such as a transparent plastic film for optical use or glass, etc., and an optical film obtained by aligning and fixing the polymerizable composition on a substrate.

BACKGROUND ART

Recently, as markets on watches, notebook PCs, cellular phones, televisions and monitors have been tremendously extended, the demand for displays of low weight and low power consumption has been greatly increased year after year. Especially, a liquid crystal display (LCD), which has properties such as a light weight, and thin thickness, and requires low power consumption, has been widely applied to such products.

However, an LCD has a disadvantage of viewing angle dependency. In other words, an LCD shows variations in color or light/darkness depending on viewing directions or angles. Also, as a size of a display screen increase, a viewing angle decreases. As compared to a conventional CRT (cathode ray tube) device having a viewing angle of about 180°, a TFT-LCD with no viewing angle compensation shows a viewing angle of merely about ±50°.

In order to solve the above described problems, various methods have been used, such methods including a multi-domain method in which a pixel is divided into several regions within a liquid crystal cell to control liquid crystal alignment, a method of controlling voltage, and a method of utilizing an optical compensation film.

The above-mentioned viewing angle dependency of an LCD is caused by the incident light having a tilt angle to an LCD panel, which shows a birefringence effect different from that of the vertical incident light. In order to compensate for this, a method of using an optical compensation film has been widely used, in which retardation films having opposite birefringence indexes to a panel are attached onto both surfaces of the panel. Also, as the size of a display panel has increased, a high-quality liquid crystal compensation film has been needed.

In an IPS (In-plane switching) mode where liquid crystal molecules are horizontally aligned, when two electrodes on one side substrate are driven, the liquid crystal molecules are rotated on a plane, thereby transmitting or blocking light. In such an IPS mode, the amount of light is adjusted by horizontal movement of the liquid crystal molecules, and thus the viewing angle property is significantly improved. Accordingly, the IPS mode is currently used for various products. Unlike a VA mode, the IPS mode is excellent in a viewing angle and a color shift, even in a state where a retardation film is not basically applied. However, as performance of an LCD TV is required to be improved, properties of the IPS mode, such as a viewing angle and a color shift, are required to be improved.

Recently, U.S. Pat. No. 6,115,095 disclosed a structure attached with a +C plate, that is, a positive uniaxial optical anisotropic film whose optical axis is perpendicular to the plane thereof, and a structure attached with a +A plate, that is, a positive uniaxial optical anisotropic film whose optical axis is parallel to the plane thereof. In particular, it was disclosed that when such retardation films are applied in an IPS mode, it is possible to achieve more desirable properties in a viewing angle and a color shift.

Japanese Laid-Open Patent No. 2001-166133 disclosed a technology of manufacturing a retardation film by controlling a phase difference property in an appropriate way, such as an extension treatment of a film made of a polymer, or a refractive index control of the film in a thickness direction, etc. Especially, the control of the refractive index in a thickness direction is achieved by adhering one or two heat shrinkable films to one or both surfaces of a film through an adhesive layer, etc., adding the contraction force of the heat shrinkable film to the film through heating, and thus extending or contracting the film in a vertical direction or in one side or both directions under operation of the contraction force. However, such a method has a problem in that there is a limitation in extending the film in a thickness direction, and it is impossible to control a phase difference in a thickness direction over a wide range. Also, in the method of contracting the film by adding the contraction force of the heat shrinkable film to the film, as the thickness of the retardation film is increased up to a range of about 50 to 100 microns, it is difficult to sufficiently satisfy the requirement for reduction in thickness of the film.

Also, Japanese Laid-Open Patent No. 2003-149441 disclosed a retardation film capable of controlling a phase difference in a thickness direction over a wide range, in which a C plate (a homeotropic alignment liquid crystal film) and an A plate having a retardation film are laminated and integrated, the homeotropic alignment liquid crystal film being formed by a homeotropic alignment liquid crystal composition containing a homeotropic alignment side-chain type liquid crystal polymer or a photopolymerizable liquid crystal compound together with the side-chain type liquid crystal polymer. However, the method of forming a homeotropic alignment liquid crystal film by using a side-chain type liquid crystal polymer has a problem in that a high temperature heat treatment with a glass transition temperature (Tg) (that is, a heat treatment temperature in which the polymer can be in a liquid crystal phase) of 60~300° C., (more specifically, of 70~200° C.) is required, and is difficult to apply to a continuous process at a high speed because the heat treatment requires 20 seconds to 30 minutes. Also, when the heat treatment is completed, a cooling treatment, such as air cooling or water cooling, etc. is required in order to fix the alignment of the homeotropic alignment liquid crystal film, and thus it is more difficult to apply the method to the continuous process. Also, the liquid crystal polymer containing liquid crystal polymers has low solubility in a conventionally used solvent.

Methods of manufacturing an optical film using a polymerizable liquid crystal have been recently reported in many reports. However, in most of them, an optical film is manufactured by coating a polymerizable liquid crystal material on a substrate of an alignment film, aligning the coated material, and fixing the aligned material through exposure, but a polymerizable liquid crystal material for a homeotropic alignment is not specifically mentioned.

DISCLOSURE

Technical Problem

Therefore, the present invention has been made in view of the above-mentioned problems, and it is an object of the present invention to provide a polymerizable liquid crystal composition having a homeotropic alignment, which is applicable to a supporting substrate, such as a transparent plastic film for optical use or glass, etc.

Another object of the present invention is to provide an optical film and device using the liquid crystal composition.

Technical Solution

In accordance with an aspect of the present invention, there is provided a polymerizable liquid crystal composition including polymerizable liquid crystal compounds. Preferably, the polymerizable liquid crystal composition of the present invention has a homeotropic alignment.

In accordance with another aspect of the present invention, there is provided an optical film using the polymerizable liquid crystal composition and a liquid crystal display device including the optical film.

Hereinafter, the present invention will be described in detail.

A polymerizable liquid crystal composition according to the present invention includes compounds represented by Formula 1 and Formula 2.

[Formula 1]

In formula 1, $G^1$ represents

V represents —H, —$CH_3$, —$CH_2CH_3$, —F, —Cl, —Br, or —$CF_3$;

$R^1$ represents —H, or $C_1$~$C_3$ alkyl;

$X^1$ represents —O—, —NH—, $C_1$~$C_{12}$ alkylene, or a single bond;

$A^1$ represents $C_1$~$C_{12}$ alkylene, $C_2$~$C_{12}$ alkenylene, —$(CH_2CH_2O)_n$—, —$(CH_2CHCH_3O)_n$—, —$(CHCH_3CH_2O)_n$—, or a single bond, n represents an integer of 1 to 5;

$K^1$ represents —O—, —NH—, $C_1$~$C_{12}$ alkylene, or a single bond;

each of $Y^1$ and $Y^2$ independently represents —O—, —NH—, $C_1$~$C_3$ alkylene, —CH=CH—, —C≡C—, —C(=O)O—, —OC(=O)—, —C(=O)—, or a single bond;

Z represents $C_1$~$C_5$ alkyl, or $C_2$~$C_5$ alkenyl;

ring A represents ring B represents each of a and b independently represents an integer of 0 to 2; and each of $Q^1$ to $Q^8$ independently represents —H, —F, —Cl, —Br, —I, —CN, —OH, —$CH_3$, —$CH_2CH_3$, —$CF_3$, or —C(=O)$CH_3$.

[Formula 2]

In formula 2, each of $G^2$ and $G^3$ independently represents

V represents —H, —$CH_3$, —$CH_2CH_3$, —F, —Cl, —Br, or —$CF_3$;

$R^1$ represents —H, or $C_1$~$C_3$ alkyl;

each of $X^2$ and $X^3$ independently represents —O—, —NH—, $C_1$~$C_{12}$ alkylene, or a single bond;

each of $A^2$ and $A^3$ independently represents $C_1$~$C_{12}$ alkylene, $C_2$~$C_{12}$ alkenylene, —$(CH_2CH_2O)_n$—, —$(CH_2CHCH_3O)_n$—, —$(CHCH_3CH_2O)_n$—, or a single bond, n represents an integer of 1 to 5;

each of $K^2$ and $K^3$ independently represents —O—, —NH—, $C_1$~$C_{12}$ alkylene, or a single bond;

$Y^3$ represents —O—, —NH—, $C_1$~$C_3$ alkylene, —CH=CH—, —C≡C—, —C(=O)O—, —OC(=O)—, —C(=O)—, or a single bond;

ring C represents ring D represents and each of $Q^1$ to $Q^8$ independently represents —H, —F, —Cl, —Br, —I, —CN, —OH, —CH$_3$, —CH$_2$CH$_3$, —CF$_3$, or —C(=O)CH$_3$.

In a polymerizable liquid crystal composition of the present invention, the compound represented by Formula 1 is a polymerizable liquid crystal compound having cyclohexyl or bicyclohexyl at a molecular end, and the compound represented by Formula 2 is a polymerizable liquid crystal compound, of which a mesogenic core has two rings.

Specifically, the compound represented by Formula 1 includes a polymerizable functional group introduced in one side end of a molecule, and one cyclohexyl ring or at least two cyclohexyl rings (bicyclohexyl) at a mesogenic core end. Also, as the compound represented by Formula 1, each of compounds having one or two cyclohexyl rings may be used alone or in combination. It is preferable to use the two compounds in combination from the standpoint of a vertical alignment property and a coating property.

In the case of various liquid crystal compounds, the alignment property can be generally adjusted according to the kind of alignment film or an additive included in a composition. For example, when a fluorine-based surfactant or a silicon-based surfactant is added, the vertical alignment property of a liquid crystal composition is improved. However, in the case of a vertical alignment accelerator, the usage amount is limited because defects may be caused on the surface of a final film according to the kind or amount of used material.

On the other hand, the compound represented by Formula 1 has a better vertical alignment property in itself, as compared to many conventional polymerizable liquid crystal compounds. Thus, the use of the compound in a composition in a certain amount or more may improve the vertical alignment property of the composition. Accordingly, when a liquid crystal composition of the present invention is used for homeotropic alignment, the usage amount of the vertical alignment accelerator may be reduced, or the vertical alignment accelerator is not required, unlike a conventional liquid crystal composition. Therefore, after the manufacture of a film, the film may have no defects on the surface thereof.

Also, in order to provide a sufficient mechanical property to the optical film manufactured by using the liquid crystal composition of the present invention, the compound represented by Formula 2 included in the liquid crystal composition of the present invention is preferably a polymerizable liquid crystal compound including polymerizable functional groups introduced in both side ends of a molecule.

Also, it is generally known that as a multi-functional polymerizable liquid crystal compound, a compound of which a mesogenic core part has three rings is used. However, from the standpoint of a vertical alignment property, a polymerizable liquid crystal compound of which a mesogenic core part has two rings is more preferable. If the mesogenic core part has three or more rings, the length and behavior of a molecule increases and the molecule has a tendency to be aligned horizontally rather than vertically. On the other hand, if the mesogenic core part has one ring, it is difficult for a compound to have liquid crystallinity, and there is a probability that a vertical alignment property is reduced due to decreased interactions with other polymerizable liquid crystal compounds.

Therefore, a multi-functional polymerizable liquid crystal compound included in the liquid crystal composition of the present invention preferably has two polymerizable functional groups and a mesogenic core part having two rings, and more preferably, is represented by Formula 2.

Examples of the compound represented by Formula 1 are as follows, but the present invention is not limited thereto.

Also, examples of the compound represented by Formula 2 are as follows, but the present invention is not limited thereto.

a polymerizable group, such as a vinyl group, a vinyloxy group, an acrylic group, or a methacrylic group, is preferred.

In the present invention, the compound represented by Formula 1 may be included in an amount of 10 to 60 parts by weight, preferably of 20 to 50 parts by weight, based on 100 parts by weight of total liquid crystal composition. If the content of the compound is less than 10 parts by weight, the vertical alignment property of the liquid crystal composition may be reduced. On the other hand, if the content of the compound is greater than 60 parts by weight, the coating property may be reduced.

Also, the compound represented by Formula 2 may be included in an amount of 10 to 50 parts by weight, preferably of 20 to 40 parts by weight, based on 100 parts by weight of total liquid crystal composition. If the content of the compound is less than 10 parts by weight, an optical film manufactured by using the liquid crystal composition may have insufficient strength and heat resistance. On the other hand, if the content of the compound is greater than 50 parts by weight, the vertical alignment property may be reduced.

The polymerizable liquid crystal composition of the present invention may include, in addition to the compounds represented by Formula 1 and Formula 2, various kids of compounds which can be mixed as required without suppressing the liquid crystallinity. Examples of such a compound include a polymerizable liquid crystal compound, a polymerizable non-liquid crystal compound, and a polymer, which are used in a conventional liquid crystal composition, and the composition ratio may vary according to the purposes. As the polymerizable compounds, a compound having The liquid crystal composition of the present invention may include a photoreaction initiator as required, and herein, conventional photoreaction initiators known in the art may be used without any particular limitation. Non examples of the photoreaction initiator include benzoyl ether, benzoyl isobutyl ether, benzoyl isopropyl ether, benzophenone, acetophenone, 4-benzoyl-4'-methyl diphenyl sulfide, benzyl methyl ketal, dimethylaminomethyl benzoate, 3,3'-dimethyl-4-methoxybenzophenone, methylbenzoyl formate, 2-methyl-1-(4-methylthio)phenyl)-2-morpholinopropane-1-one, 2-benzyl-2-dimethylamino-1-(4-morpholinophenyl)-butane-1-one, 1-hidroxycyclohexyl phenyl ketone, Irgacure based, etc. Also, the photoreaction initiator may be added in an amount of 0.001 to 20 parts by weight, preferably of 0.01 to 10 parts by weight, based on 100 parts by weight of polymerizable liquid crystal compound.

Also, the liquid crystal composition according to the present invention may include an organic solvent as required. The organic solvent included in the liquid crystal composition facilitates the application (coating) of the liquid crystal composition on a substrate such as a film.

Herein, as the organic solvent, conventional organic solvents known in the art may be used without any particular limitation. Non-limiting examples of the organic solvent include: hydrocarbons such as cyclohexane, cyclopentane, benzene, toluene, xylene, butylbenzene, etc.; ketones such as acetone, methyl ethyl ketone, methyl isobutyl ketone, cyclohexanone, etc.; esters such as ethyl acetate, ethylene glycol monomethyl ether acetate, propylene glycol monomethyl ether acetate, gamma-butyrolactone, etc.; amides such as 2-pyrrolidone, N-methyl-2-pyrrolidone, dimethyl formamide, dimethylacetamide, etc.; halogens such as chloroform, dichloromethane, carbon tetrachloride, dichloroethane, tetrachloroethane, tetrachloroethylene, chlorobenzene, etc.; alcohols such as t-butyl alcohol, diacetone alcohol, glycerin, monoacetin, ethylene glycol, triethylene glycol, hexylene glycol, ethylene glycol monomethyl ether, etc.; phenols such as phenol, parachlorophenol, etc.; and ethers such as methoxybenzene, 1,2-dimethoxybenzene, diethylene glycol dimethyl ether, ethylene glycol dimethyl ether, ethylene glycol diethyl ether, propylene glycol dimethyl ether, propylene glycol diethyl ether, diethylene glycol dimethyl ether, diethylene glycol diethyl ether, dipropylene glycol dimethyl ether, dipropylene glycol diethyl ether, etc. Also, such an organic solvent can be independently used, or can be used by mixing at least two of these materials, and herein, the usage amount is not limited.

Also, the liquid crystal composition of the present invention may include a surfactant as required. A surfactant may be used to allow a liquid crystal composition to be easily applied on a substrate. As the surfactant, conventional surfactants known in the art may be used without any particular limitation, and the addition amount may vary according to the kind of surfactant, the composition ratio of components of a liquid crystal composition, the kind of solvent, and the kind of substrate.

Also, the liquid crystal composition of the present invention may include a chiral dopant, a leveling agent, etc. which inhibit a spiral structure of liquid crystal or reverse distortion of liquid crystal, etc. as an additional additive.

The liquid crystal composition of the present invention may be prepared in a conventional manner. Typically, in the preparation, various components are dissolved at room temperature or high temperature.

The present invention provides an optical film using the polymerizable liquid crystal composition according to the present invention.

The optical film of the present invention is manufactured by forming an optically anisotropic layer, that is, a liquid crystal film, on a transparent substrate. Herein, a liquid crystal alignment state in the liquid crystal film can be adjusted by appropriately selecting a polymerizable liquid crystal compound and other compounds forming the liquid crystal composition.

In the optical film of the present invention, as the substrate, a material allowing a liquid crystal film to be formed on the surface thereof may be used. Examples of the substrate include a polymer film, metal, or glass, etc.

Non-limiting examples of the polymer film include polyimide, polyamide imide, polyamide, polyetherimide, polyetheretherketone, polyetherketone, polyketone sulfide, polyethersulfone, cycloolefin polymer, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose, epoxy resin, phenol resin, etc., and herein the examples may be a uniaxially oriented film or a biaxially oriented film. Also the polymer film may be used after surface treatment such as hydrophilic treatment or hydrophobic treatment, and may be a laminated film. Also, non-limiting examples of the metal include aluminum, iron, copper, etc., which have slit-shaped surface grooves; and non-limiting examples of the glass include alkali glass, boric glass, print glass, etc., which have slit-shaped surfaces through etching.

Also, the substrate may have an alignment film formed thereon. Non-limiting examples of a material for the alignment film include polyimide, polyamide, polyacrylate, polyvinyl alcohol, polycycloolefin, etc.

Some of the substrate materials can be directly used due to sufficient capability of aligning a liquid crystal compound. However, in order to enhance alignment capability, the substrate materials may be subjected to separate treatment, such as rubbing, stretching, polarization irradiation, or skew ray irradiation, before being used as the substrate.

Herein, the rubbing can be directly performed on a substrate, or can be performed on an alignment film previously formed on the substrate.

The optical film according to the present invention may be fabricated by common methods well known in the art. As an example, the optical film of the present invention may be fabricated by coating the inventive liquid crystal composition on a substrate, drying the coated liquid crystal composition to thereby aligning the liquid crystal compound, and then curing the aligned liquid crystal compound while maintaining the alignment form of the liquid crystal compound to thereby fix the alignment form.

The coating of a liquid crystal composition on a substrate may be performed in a conventional manner. Non-limiting examples of such a coating include spin coating, roll coating, printing, dip-drawing coating, curtain coating, die coating, dip coating, etc.

The drying process may be performed in a conventional manner, and herein, a liquid crystal compound is aligned during the drying process or is aligned by additionally heating after the drying process. The conditions of drying vary according to a boiling point of an organic solvent used for a liquid crystal composition, and materials for a substrate and an alignment layer, without any particular limitation. Also, it is possible to dry by heating, or to gradually dry at room or low temperature.

The curing process may be performed by irradiating rays and/or heat-treating on a coated liquid crystal composition. In the process, polymerization is carried out by a polymerizable group of a polymerizable compound, and a liquid crystal compound with a fixed alignment is attached on a substrate, thereby forming a liquid crystal film with an optically anisotropic layer. The wavelengths of the rays used for the curing process may include, but are not limited to, electron beams, ultraviolet rays, visible rays, infrared rays, etc. Also, the heat-treating is generally performed at 10~200° C. from 3 seconds to 30 minutes, but the conditions of the heat-treating are not limited to this.

Also, the optical film according to the present invention may be manufactured by coating a liquid crystal composition on a peelable film, drying the composition, forming a liquid crystal film through a curing process, and transferring the formed liquid crystal film to a substrate by using a gluing agent or adhesives.

The optical film according to the present invention may be used as an optical compensation film or a polarizer using the optical compensation film, and may be provided in a liquid crystal display device, preferably in an IPS mode liquid crystal display device.

Advantageous Effects

In application on a supporting substrate, such as a transparent plastic film for optical use, or glass, etc., a polymerizable liquid crystal composition according to the present invention has an excellent vertical alignment property. Thus,

BEST MODE

Reference will now be made in detail to the preferred embodiments of the present invention. However, the following examples are illustrative only, and the scope of the present invention is not limited thereto.

Example 1

Preparation of a Liquid Crystal Composition 1

A liquid crystal composition 1 was prepared according to the following composition ratio.

Manufacture of an Optical Compensation Film 9.28 g of liquid crystal composition 1 was dissolved in 15 g of xylene, and 600 mg of Irgacure 907 (2-Methyl-4'-(methylthio)-2-morpholinophenone) as a photoreaction initiator, 40 mg of FC-4430 as an alignment accelerator, and 80 mg of BYK-300 as a leveler were added and were sufficiently shaken. After the mixture was completely dissolved, a particle filter was used to prepare a solution of which foreign particles were removed, and the solution was bar-coated by using a wire-bar, onto an oriented COP (cyclo-olefin polymer) treated with an alignment layer, followed by drying in a 50° C. oven for 1 minute, and UV (200 W~80 W/m) irradiation, to obtain a compensation film.

Example 2

Preparation of a Liquid Crystal Composition 2

A liquid crystal composition 2 was prepared according to the following composition ratio.

-continued 25 wt%

15 wt%

30 wt%

Manufacture of an Optical Compensation Film

A compensation film was manufactured in the same manner as described in Example 1, except that the liquid crystal composition 2 prepared by Example 2 was used instead of the liquid crystal composition 1 prepared by Example 1.

Example 3

Preparation of a Liquid Crystal Composition 3

A liquid crystal composition 3 was prepared according to the following composition ratio.

30 wt%

30 wt%

10 wt%

30 wt%

Manufacture of an Optical Compensation Film

A compensation film was manufactured in the same manner as described in Example 1, except that the liquid crystal composition 3 prepared by Example 3 was used instead of the liquid crystal composition 1 prepared by Example 1.

Example 4

Preparation of a Liquid Crystal Composition 4

A liquid crystal composition 4 was prepared according to the following composition ratio.

20 wt%

20 wt%

30 wt%

30 wt%

Manufacture of an Optical Compensation Film

A compensation film was manufactured in the same manner as described in Example 1, except that the liquid crystal composition 4 prepared by Example 4 was used instead of the liquid crystal composition 1 prepared by Example 1.

Comparative Example 1

Preparation of a Liquid Crystal Composition 5

A liquid crystal composition 5 was prepared according to the following composition ratio.

40 wt %

30 wt %

30 wt %

Manufacture of an Optical Compensation Film

A compensation film was manufactured in the same manner as described in Example 1, except that the liquid crystal composition 5 prepared by Comparative Example 1 was used instead of the liquid crystal composition 1 prepared by Example 1.

Comparative Example 2

Preparation of a Liquid Crystal Composition 6

A liquid crystal composition 6 was prepared according to the following composition ratio.

30 wt%

30 wt%

40 wt%

Manufacture of an Optical Compensation Film

A compensation film was manufactured in the same manner as described in Example 1, except that the liquid crystal composition 6 prepared by Comparative Example 2 was used instead of the liquid crystal composition 1 prepared by Example 1.

Test on Physical Properties of a Compensation Film

On each of the compensation films manufactured by Examples 1 to 4 and Comparative Examples 1 and 2, the alignment property was tested.

Figure 1:
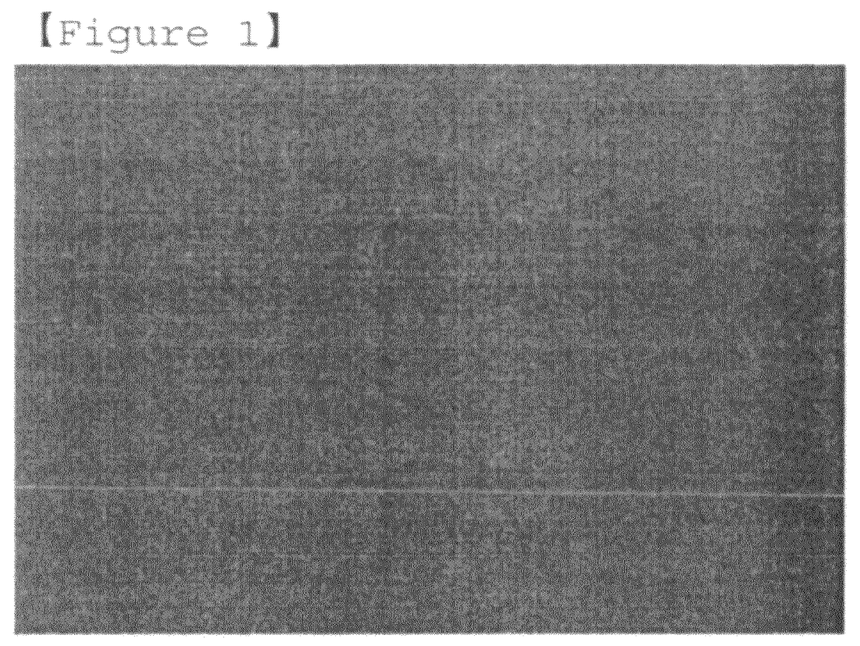
FIG. 1 is a polarizing microscopic photograph in a black state when a compensation film manufactured according to one embodiment of to the present invention is used.
Figure 2:
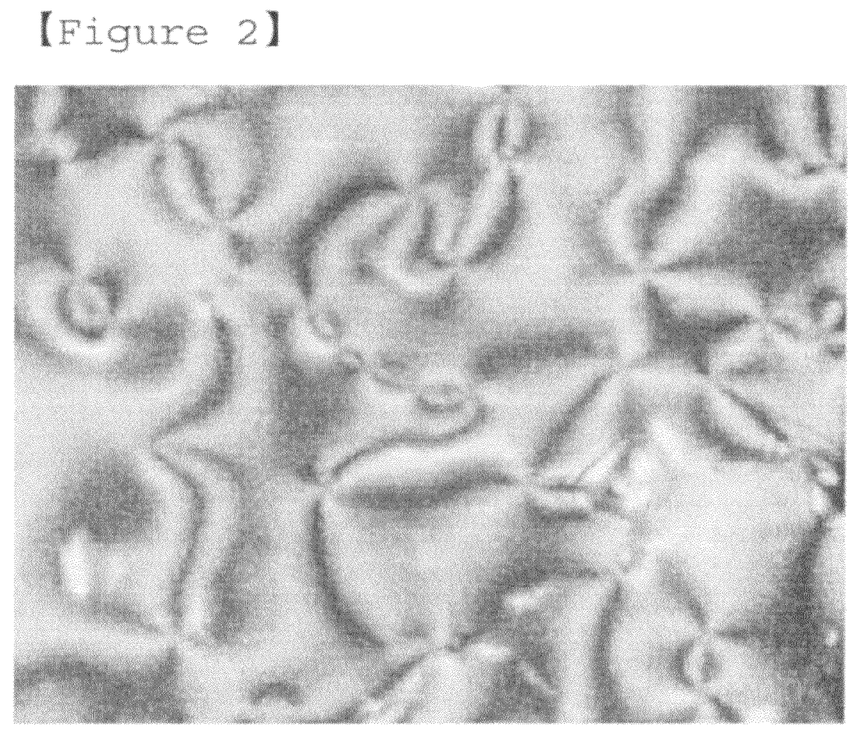
FIG. 2 is a polarizing microscopic photograph of a nematic liquid crystal phase of a liquid crystal composition prepared according to one embodiment of to the present invention.

Specifically, a polarizing film was provided in each of top and bottom of the compensation film, and the contrast state was tested by irradiating light from the lower side. In the case of Examples 1 to 4, a black state was shown by vertical alignment of the polymerizable liquid crystal composition of the present invention (see FIG. 1), and defects, such as dewetting or pin holes, etc. did not occur in the film.

On the other hand, in the case of Comparative Examples 1 and 2, the liquid crystal composition was not vertically aligned, and light leakage was shown. Such a light leakage phenomenon indicates that the vertical alignment of the liquid crystal composition is poor, which significantly reduces required physical properties, such as a viewing angle, contrast ratio, and color shift according to the viewing angle. Meanwhile, in Comparative Examples 1 to 2, when the amount of a vertical aligning agent was increased, the light leakage phenomenon disappeared, but defects, such as dewetting or pin holes, etc. occurred in the film.

The invention claimed is:

1. A polymerizable liquid crystal composition comprising a compound represented by Formula 1 and a compound represented by Formula 2:

[Formula 1]

wherein $G^1$ represents

V represents —H, —$CH_3$, —$CH_2CH_3$, —F, —Cl, —Br, or —$CF_3$, $R^1$ represents —H, or $C_1$~$C_3$ alkyl;

$X^1$ represents —O—, —NH—, $C_1$~$C_{12}$ alkylene, or a single bond;

$A^1$ represents $C_1$~$C_{12}$ alkylene, $C_2$~$C_{12}$ alkenylene, —$(CH_2CH_2O)_n$—, —$(CH_2CHCH_3O)_n$—, —$(CHCH_3CH_2O)_n$—, or a single bond, n represents an integer of 1 to 5;

$K^1$ represents —O—, —NH—, $C_1$~$C_{12}$ alkylene, or a single bond;

each of $Y^1$ and $Y^2$ independently represents —O—, —NH—, $C_1$~$C_3$ alkylene, —CH=CH—, —C≡C—, —C(=O)O—, —OC(=O)—, —C(=O)—, or a single bond;

Z represents $C_1$~$C_5$ alkyl, or $C_2$~$C_5$ alkenyl;

ring A represents ring B represents each of a and b independently represents an integer of 0 to 2; and each of $Q^1$ to $Q^8$ independently represents —H, —F, —Cl, —Br, —I, —CN, —OH, —CH$_3$, —CH$_2$CH$_3$, —CF$_3$, or —C(=O)CH$_3$; and

[Formula 2]

wherein each of $G^2$ and $G^3$ independently represents

V represents —H, —CH$_3$, —CH$_2$CH$_3$, —F, —Cl, —Br, or —CF$_3$;

$R^1$ represents —H, or $C_1$~$C_3$ alkyl;

each of $X^2$ and $X^3$ independently represents —O—, —NH—, $C_1$~$C_{12}$ alkylene, or a single bond;

each of $A^2$ and $A^3$ independently represents $C_1$~$C_{1-2}$ alkylene, $C_2$~$C_{1-2}$ alkenylene, —(CH$_2$CH$_2$O)$_n$—, —(CH$_2$CHCH$_3$O)$_n$—, —(CHCH$_3$CH$_2$O)$_n$—, or a single bond, n represents an integer of 1 to 5;

each of $K^2$ and $K^3$ independently represents —O—, —NH—, $C_1$~$C_{12}$ alkylene, or a single bond;

$Y^3$ represents —O—, —NH—, $C_1$~$C_3$ alkylene, —CH=CH—, —C≡C—, —C(=O)O—, —OC(=O)—, —C(=O)—, or a single bond;

ring C represents ring D represents and each of $Q^1$ to $Q^8$ independently represents —H, —F, —Cl, —Br, —I, —CN, —OH, —CH$_3$, —CH$_2$CH$_3$, —CF$_3$, or —C(=O)CH$_3$.

2. The polymerizable liquid crystal composition as claimed in claim 1, wherein the compound represented by Formula 1 is included in an amount of 10 to 60 parts by weight, based on 100 parts by weight of total liquid crystal composition.

3. The polymerizable liquid crystal composition as claimed in claim 1, wherein the compound represented by Formula 2 is included in an amount of 10 to 50 parts by weight, based on 100 parts by weight of total liquid crystal composition.

4. An optical film using the liquid crystal composition as claimed in claim 1, wherein the liquid crystal composition comprises a compound represented by Formula 1 and a compound represented by Formula 2:

[Formula 1]

wherein $G^1$ represents

V represents —H, —CH$_3$, —CH$_2$CH$_3$, —F, —Cl, —Br, or —CF$_3$;

$R^1$ represents —H, or $C_1$~$C_3$ alkyl;

$X^1$ represents —O—, —NH—, $C_1$~$C_{12}$ alkylene, or a single bond;

$A^1$ represents $C_1$~$C_{12}$ alkylene, $C_2$~$C_{12}$ alkenylene, —(CH$_2$CH$_2$O)$_n$—, —(CH$_2$CHCH$_3$O)$_n$—, —(CHCH$_3$CH$_2$O)$_n$—, or a single bond, n represents an integer of 1 to 5;

$K^1$ represents —O—, —NH—, $C_1$~$C_{12}$ alkylene, or a single bond;

each of $Y^1$ and $Y^2$ independently represents —O—, —NH—, $C_1$~$C_3$ alkylene, —CH=CH—, —C≡C—, —C(=O)O—, —OC(=O)—, —C(=O)—, or a single bond;

Z represents $C_1$~$C_5$ alkyl, or $C_2$~$C_5$ alkenyl;

ring A represents ring B represents each of a and b independently represents an integer of 0 to 2; and each of $Q^1$ to $Q^8$ independently represents —H, —F, —Cl, —Br, —I, —CN, —OH, —CH$_3$, —CH$_2$CH$_3$, —CF$_3$, or —C(=O)CH$_3$; and

[Formula 2]

wherein each of $G^2$ and $G^3$ independently represents

V represents —H, —CH$_3$, —CH$_2$CH$_3$, —F, —Cl, —Br, or —CF$_3$;
$R^1$ represents —H, or $C_1$~$C_3$ alkyl;
each of $X^2$ and $X^3$ independently represents —O—, —NH—, $C_1$~$C_{12}$ alkylene, or a single bond;
each of $A^2$ and $A^3$ independently represents $C_1$~$C_{12}$ alkylene, $C_1$~$C_{12}$ alkenylene, —(CH$_2$CH$_n$O)$_n$—, —(CH$_2$CHCH$_3$O)$_n$—, —(CHCH$_3$CH$_2$O)$_n$—, or a single bond, n represents integer of 1 to 5;
each of $K^2$ and $K^3$ independently represents —O—, —NH—, $C_1$~$C_{12}$ alkylene, or a single bond;
$Y^3$ represents —O—, —NH—, $C_1$~$C_3$ alkylene, —CH=CH—, —C≡C—, —C(=O)O—, —OC(=O)—, —C(=O)—, or a single bond;
ring C represents ring D represents and
each of $Q^1$ to $Q^8$ independently represents —H, —F, —Cl, —Br, —I, —CN, —OH, —CH$_3$, —CH$_2$CH$_3$, —CF$_3$, or —C(=O)CH$_3$.

5. A liquid crystal display device comprising the optical film as claimed in claim 4.

6. The liquid crystal display device as claimed in claim 5, which is an IPS mode liquid crystal display device.

7. The liquid crystal display device as claimed in claim 5, wherein the compound represented by Formula 1 is included in an amount of 10 to 60 parts by weight, based on 100 parts by weight of total liquid crystal composition.

8. The liquid crystal display device as claimed in claim 5, wherein the compound represented by Formula 2 is included in an amount of 10 to 50 parts by weight, based on 100 parts by weight of total liquid crystal composition.

9. The optical film using the liquid crystal composition as claimed in claim 4, wherein the compound represented by Formula 1 is included in an amount of 10 to 60 parts by weight, based on 100 parts by weight of total liquid crystal composition.

10. The optical film using the liquid crystal composition as claimed in claim 4, wherein the compound represented by Formula 2 is included in an amount of 10 to 50 parts by weight, based on 100 parts by weight of total liquid crystal composition.

\* \* \* \* \*